United States Patent [19]
Nara et al.

[11] 3,901,972
[45] Aug. 26, 1975

[54] ANTIBIOTIC XK-33-F$_2$ AND PROCESS FOR PRODUCING SAME

[75] Inventors: Takashi Nara, Tokyo; Seigo Takasawa, Kawasaki; Ryo Okachi, Machida; Isao Kawamoto, Machida; Masaru Kumakawa, Machida; Mitsuyoshi Yamamoto, Machida; Seiji Sato, Machida, all of Japan

[73] Assignee: Abbott Laboratories, North Chicago, Ill.

[22] Filed: Dec. 26, 1972

[21] Appl. No.: 318,337

Related U.S. Application Data

[63] Continuation-in-part of Ser. No. 212,620, Dec. 27, 1971, abandoned.

[52] U.S. Cl. .................................. 424/116; 195/80
[51] Int. Cl. ............................................ A61k 21/00

[58] Field of Search ....................... 424/116; 195/80

[56]       References Cited
       OTHER PUBLICATIONS

Miller, Pfizer Handbook of Microbial Metabolities, McGraw-Hill Book Co., Inc., N.Y., N.Y., 1961, p. 451.

*Primary Examiner*—Jerome D. Goldberg
*Attorney, Agent, or Firm*—Gildo E. Fato; Robert L. Niblack

[57]              ABSTRACT

A new antibiotic designated XK-33-F$_2$ is produced by culturing strains of microorganisms belonging to the genus *Streptomyces*, which are capable of producing the antibiotic, in a nutrient medium. The antibiotic is thereafter separated and recovered from the medium.

2 Claims, 2 Drawing Figures

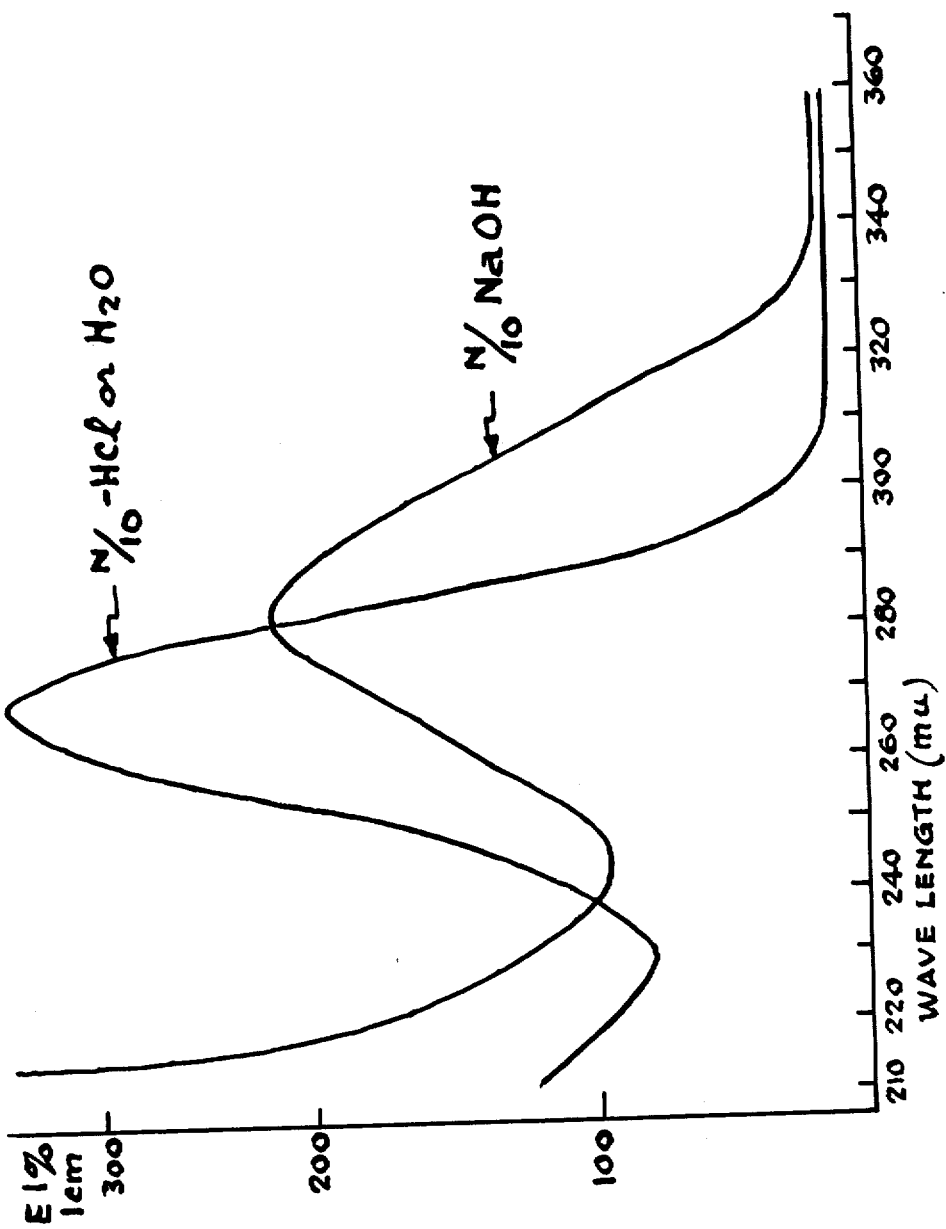

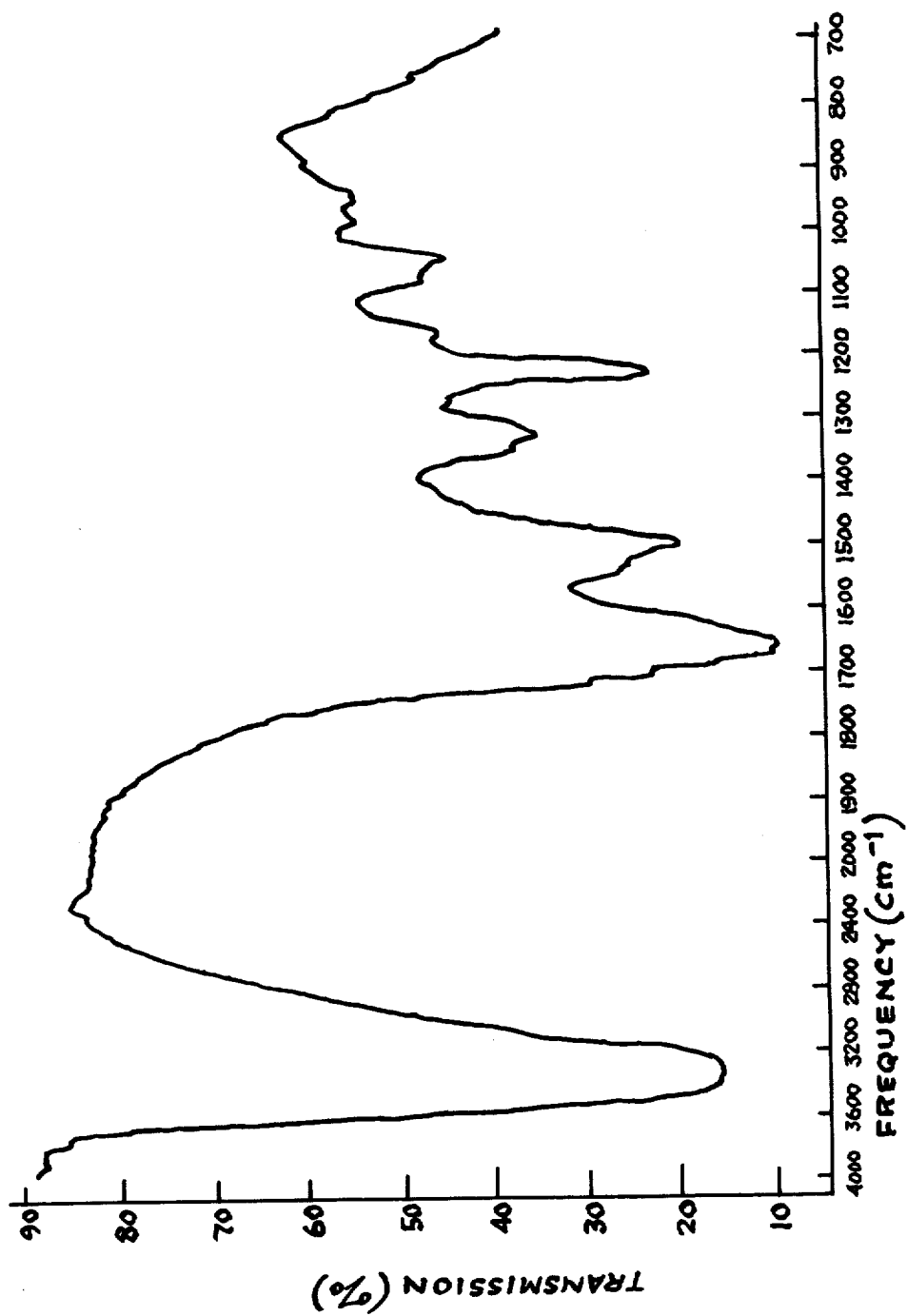

ANTIBIOTIC XK-33-F₂ AND PROCESS FOR PRODUCING SAME

CROSS-REFERENCE TO RELATED APPLICATIONS

This application is a continuation-in-part of copending application U.S. Ser. No. 212,620, filed Dec. 27, 1971, now abandoned.

BACKGROUND OF THE INVENTION

The present invention relates to a process for producing a new antibiotic XK-33-F$_2$ by fermentation and more particularly, to a process which comprises culturing a strain of microorganism belonging to the genus *Streptomyces*, which is capable of producing the antibiotic XK-33-F$_2$, in a suitable medium to form said antibiotic, and recovering same from the culture liquor.

New antibiotics are always in demand and particularly those which are effective against a broad spectrum of bacteria are greatly sought after. However, even when a new antibiotic is found, it must be producible on an industrial scale in order to be economically feasible. To this end, the present inventors have isolated a new antibiotic effective upon Gram-positive, Gram-negative and acid fast bacteria. In addition, the present inventors have developed a process for production of this antibiotic.

SUMMARY OF THE INVENTION

In accordance with the present invention, a new antibiotic designated XK-33-F$_2$ is produced. The antibiotic is produced by strains of microorganisms belonging to the genus *Streptomyces*. A particularly suitable microorganism is *Streptomyces olivoreticuli* var. *cellulophilus* which has been newly found and named by the present inventors. Its typical strain, which has been isolated from soil found in a district in Japan, has been deposited with the American Type Culture Collection in Rockville, Md. and has been accorded accession number 21632.

The above-mentioned strain is characterized morphologically by growth which is yellowish brown with grayish white or slightly greenish cream-colored aerial mycelia. Formation of melanine is observed on various media. Sporophores are secondarily formed from the aerial mycelia and they form whorls. In most cases the spores form in line by ten or more, forming a flexuous curve; and spore surface is smooth. No spirals are observed.

Culturing characteristics of the above-noted strain after culturing respectively on 18 kinds of media at 36°C for 2 weeks are shown in the following TABLE 1.

TABLE 1

| Name of medium | Growth | Substrate[1] mycelium | Aerial[1] mycelium | Formation of aerial mycelium | Soluble[1] pigments |
|---|---|---|---|---|---|
| Yeast extract malt extract agar | good | brown S:(3 hg)[2] R:(3 hg) | gray (b) | moderate | none |
| Starch agar | good | brown S:(3 ng) R:(3 ng) | gray (d) | moderate | none |
| Glycerol asparagine agar | good | yellowish brown S:(2 le) R:(2 le) | greenish cream-colored (2 ba) | moderate | none |
| Czapek's agar | poor | colorless | gray (b) | poor | none |
| Glucose asparagine agar | moderate | brown S:(2 le) R:(3 ng) | cream-colored (2 ca) | poor | brown (3 ne) |
| Nutrient agar | good | brown S:(3 ni) R:(3 ni) | gray (2 fe) | moderate | brown (3 ni) |
| Glycerol calcium malate agar | good | thin yellowish green S:(1 ea) R:(1 ea) | greenish cream-colored (1 ba) | poor | none |
| Plain agar | poor | colorless | white (a) | poor | none |

TABLE 1—Continued

| Name of medium | Growth | Substrate[1] mycelium | Aerial[1] mycelium | Formation of aerial mycelium | Soluble[1] pigments |
|---|---|---|---|---|---|
| Egg albumin agar | poor | colorless | colorless | poor | none |
| Tyrosine agar | moderate | brown S:(3 le) R:(3 le) | cream-colored (2 ea) | poor | none |
| Peptone glucose agar | good | greenish brown S:(1½ lg) R:(2 li) | greenish gray (1 de) | moderate | greenish brown (2 li) |
| Gelatin | moderate | greenish brown S:(2 ni) R:(2 ni) | greenish cream-colored (1 ba) | moderate | brown |
| Milk | moderate | brown S:(3 lg) R:(3 lg) | gray (b) | poor | Reddish pigment was observed |
| Glucose Czapek liquor | moderate | Grow in the liquor as small greenish cream-colored spheres | greenish cream-colored (1 ba) | poor | none |
| Filter paper cellulose | moderate | colorless | none | | none |
| Potato | good | gray S:(2 ih) R:(3 li) | greenish cream-colored (2 ba) | moderate | brown (4 li) |
| Cellulose (powder) meat peptone agar | moderate | greenish brown S:(2 lg) R:(2 lg) | moderate | none | |
| Loeffler's serum | good | brown S:(2 ie) R:(5 pn) | none | | blakish brown (4 nl) only slightly |

In the above TABLE:
[1]The indication in the parentheses are in accordance with the color classification based on Color Harmony Manual (Container Corporation of America); and
[2]S: color of the surface of the substrate mycelium
R: color of the reverse side of the substrate mycelium The assimilability of carbon sources of the present strain is shown in the following TABLE 2.

TABLE 2

| Carbon source | ASSIMILABILITY OF CARBON SOURCE Assimilability | Carbon source | Assimilability |
|---|---|---|---|
| Glucose | ++ | Raffinose | − |
| Fructose | ± | Mannitol | − |
| Lactose | − | Rhamnose | ± |
| Arabinose | − | Sucrose | − |
| Inositol | ++ | Mannose | ++ |
| Glycerol | ++ | Salicin | − |
| Xylose | − | | |

In addition, the following physiological properties are noted:
1. Growth temperature: 20°C – 35°C
2. Growth pH: pH 5.0 – pH 9.0
3. Liquefaction of gelatin: observed at 25°C in 1 to 2 weeks
4. Hydrolysis of starch: strongly positive
5. Formation of tyrosinase: positive
6. Chromogenic action: positive
7. Action upon litmus milk:
   coagulation,
   peptonization,
   alkaline pH 8. Reduction of nitrates to nitrites: negative
9. Decomposition of cellulose: strongly positive The properties of the present strain were compared with those of the known Actinomycetes described in "The Actinomycetes," Vol. II, by Waksman; and the present strain has been determined to belong to "series reticuli." Of the known species in this series, the following three species are referred to as those most closely related.

1. Streptomyces olivoreticuli
2. Streptomyces verticillatus
3. Streptomyces luteoverticillatus A comparison of the properties of the present strain and those of the closely related species are shown in the following TABLE 3.

Culturing is carried out in a liquid culture medium and the submerged-stirring culture method is particularly suitable. Generally, the ordinary methods for culturing microorganisms of the Actinomycetes may be used. As for the culture medium either natural or synthetic medium may be used so long as it contains a carbon source, a nitrogen source, inorganic compounds and small amounts of additional nutrients necessary for the specific microorganism. As a carbon source, glucose, starch, glycerol, mannose, fructose, inositol, mannitol, sucrose, molasses, for example, may be used alone or in combination. In addition, hydrocarbons, alcohols, organic acids, etc. are also appropriate depending upon the assimilability thereof by the specific microorganism. As organic and inorganic nitrogen

TABLE 3

| | Streptomyces olivoreticuli var. cellulophilus | Streptomyces olivoreticuli | Streptomyces verticillatus | Streptomyces luteoverticillatus |
|---|---|---|---|---|
| Nutrient agar | gray aerial mycelium | grayish white aerial mycelium | no aerial mycelium | yellowish white aerial mycelium |
| Potato | greenish cream-colored aerial mycelium | greenish cream-colored aerial mycelium | | yellowish green aerial mycelium |
| Litmus milk | gray aerial mycelium, coagulated, peptonized, alkaline pH | coagulated, peptonized, pH; unchanged | coagulated, peptonized | brown aerial mycelium Coagulation is uncertain but peptonization is clear. |
| Cellulose | decomposed | not decomposed | not decomposed | |
| Reduction of nitrates | negative | negative | positive | |
| Assimilation of carbon sources | mannitol (−) lactose (−) | mannitol (−) lactose (+) | | mannitol (+) lactose (−) |
| Productive capacity of antibiotics | XK-33-F$_2$, viomycin, an antibiotic similar to destomycin A | viomycin | | |

Since the microorganism of the present invention appears to have a closer resemblance to Streptomyces olivoreticuli rather than to Streptomyces verticillatus or Streptomyces luteoverticillatus and since it resembles Streptomyces olivoreticuli in most characteristics except those noted above, it has been identified as a variety of Streptomyces olivoreticuli and named Streptomyces olivoreticuli var. cellulophilus.

As is the case with other strains of Actinomyces, the strains of the present invention can be mutated by artificial means such as ultraviolet ray irradiation, Co$^{60}$ irradiation, X-ray irradiation and treatment with various mutation inducers. Accordingly, any strain belonging to Streptomyces olivoreticuli var. cellulophilus and capable of producing XK–33–F$_2$ including mutants thereof can be used in the present invention.

sources, ammonium chloride, ammonium sulfate, urea, ammonium nitrate, sodium nitrate, etc., may be used alone or in combination; and as a natural nitrogen source, peptone, meat extract, yeast extract, dry yeast, corn steep liquor, soybean powder, casamino acid, etc. are appropriate. If necessary, such inorganic salts as sodium chloride, potassium chloride, calcium carbonate, phosphates, etc. may be added to the medium and other organic or inorganic substances capable of promoting growth of the specific microorganism may also be added to the medium.

Culturing is carried out at a temperature of between 20° to 40°C. and a temperature within the range of 25° to 30°C. is generally preferred. In addition, the pH should be maintained approximately neutral for best results.

It is preferred that the microorganism be initially grown in a seed medium prior to being used for inoculation of the culture medium. The seed medium is incubated under favorable growth conditions for a period of time sufficient to develop a suitable organism population. The seed medium is then used to inoculate the culture medium.

Culturing is carried out usually for 2 to 7 days and the present antibiotic is formed and accumulated in the culture liquor. When the amount of antibiotic formed in the culture liquor reaches the maximum, culturing is discontinued, and the desired product is isolated from the culture liquor after the microbial cells are removed therefrom such as by filtration.

A suitable method for isolating the antibiotic from the culture filtrate comprises a chromatography using an ion exchange resin column. For example, the culture filtrate, obtained by filtering the culture liquor together with a filter aid of the Celite type, is adjusted to pH 8, and adsorbed on a weakly acidic cation exchange resin such as Amberlite IRC-50 ($NH_4^+$ form). After washing with water, elution is initially carried out with 0.5 N $NH_4OH$, whereby only XK-33-$F_1$ is eluted. XK-33-$F_1$ is an antibiotic similar to destomycin A. Thereafter, elution is carried out with 0.5 N HCl, whereby two fractions are separately obtained. The first elution fraction containing our antibiotic XK-33-$F_2$ and the second elution fraction contains an antibiotic XK-33-$F_3$, which is identified to be viomycin.

The fraction containing XK-33-$F_2$ is adjusted to pH 8.0 and then is subjected to a column chromatography with carbon powders. After elution is carried out with 0.5 N HCl - 80 % MeOH, the resulting eluate is passed through a column of an anion exchange resin such as Dowex 1 × 2 ($OH^-$ form) and eluted with water. By freeze-drying an active fraction of the eluate, a white free base of XK-33-$F_2$ is obtained. The thus obtained substance is relatively stable in a neutral state as well as in an acidic state, but slightly unstable in an alkaline state.

The novel antibiotic produced in accordance with the present invention is hereafter further described with reference to the accompanying drawings wherein:

FIG. 1 illustrates the ultraviolet absorption spectrum of the antibiotic of the present invention; and FIG. 2 illustrates the infra-red absorption spectrum of the antibiotic.

The antibiotic produced in accordance with the present invention is a white basic powder which does not exhibit a distinct melting point, but turns brown at 200°C and decomposes at 205° – 210°C. It is soluble in water and slightly soluble in methanol, but insoluble in such organic solvents as ethanol, butanol, acetone, benzene, ethyl acetate, chloroform, ether, petroleum ether, hexane, etc.

Referring to FIG. 1, the ultraviolet absorption spectrum of the antibiotic shows a maximum absorption at 268 m$\mu$ in an aqueous solution and N/10 HCl, and at 283 m$\mu$ in N/10 NaOH. The elementary analysis of hydrochloride of the present substance reveals C; 33.28 %, H; 5.51 % and N: 21.73 %. Further, its specific rotation $[\alpha]_D^{25}$ is $-12.4°$ (C=1, $H_2O$).

The present antibiotic is positive in ninhydrin reaction and Sakaguchi reaction and exhibits yellow color with potassium permanganate, but is negative in Fehling reaction, Molisch reaction and anthrone reaction.

The infra-red absorption spectrum of the present substance is illustrated in FIG. 2. It shows characteristic peaks at the following wave lengths expressed in reciprocal centimeters: 945, 985, 1,050, 1,160, 1,230, 1,330, 1,500, 1,670 and 3,300.

As a further identification, the Rf values obtained when the present substance is subjected to a thin layer chromatography (TLC) of silica gel using three kinds of developers are given in the following TABLE 4.

TABLE 4

| Rf values, TLC of XK-33-$F_2$ wherein | |
|---|---|
| Developer | Rf values |
| (1) | 0.50 |
| (2) | 0.67 |
| (3) | 0.71 |

(1) is upper layer portion of a mixture of chloroform, methanol and 17 % aqueous ammonia (2:1:1)
(2) is a mixture of 10 % ammonium acetate and methanol (1:1)
(3) is a mixture of 10 % ammonium acetate, acetone and 10 % aqueous ammonia (9:10:0.5)

The antimicrobial spectra of the present antibiotic to various microorganisms are given in the following TABLE 5.

TABLE 5

Minimum inhibiting concentration by agar dilution method

| Microorganisms tested | ($\gamma$/ml) Minimum inhibiting concentration($\gamma$/ml) |
|---|---|
| *Streptococcus faecalis* ATCC 10541 | >1000 |
| *Staphylococcus aureus* ATCC 6538 P | 105 |
| *Staphylococcus aureus* ATCC 209 P | > 700 |
| *Staphylococcus aureus* MS 537 | > 700 |
| Resistant to streptomycin, tetracycline, penicillin G and sulfonamide. | |
| *Staphylococcus aureus* S - 3192 | > 700 |
| Resistant to erythromycin, kanamycin, paromomycin, streptomycin, tetracycline, penicillin G, sulfonamide and neomycin. | |
| *Bacillus subtilis* No. 10707 | 26 |
| *Bacillus cereus* ATCC 9634 | 44 |
| *Bacillus mycoides* ATCC 9463 | 73 |
| *Sarcina lutea* ATCC 9341 | >1000 |
| *Serratia marcescens* ATCC 4003 | > 700 |
| *Klebsiella pneumoniae* ATCC 10031 | 26 |
| *Neisseria catarrhalis* ATCC 7900 | 210 |
| *Aerobacter aerogenes* ATCC 13048 | > 700 |

TABLE 5 -Continued

Minimum inhibiting concentration by agar dilution method
(γ/ml)

| Microorganisms tested | Minimum inhibiting concentration(γ/ml) |
|---|---|
| *Escherichia coli* ATCC 26 | 13 |
| *Escherichia coli*(ECR₃) Resistant to streptomycin, kanamycin, neomycin, paromomycin, spectinomycin, tetracycline and chloramphenicol. | 200 |
| *Escherichia coli* K-12 ML 1629 (ECR₃) Resistant to chloramphenicol, kanamycin, tetracycline and neomycin. | 36 |
| *Escherichia coli* ML 1878 (ECRₐ) Resistant to streptomycin. | 36 |
| *Escherichia coli* ML 3306 (ECRₐ) Resistant to streptomycin, kanamycin, paromomycin and neomycin. | 145 |
| *Pseudomonas aeruginosa* BMH No. 1 | 52 |
| *Paracolon* sp. Abbott P-1 | >100 |
| *Proteus vulgaris* ATCC 6897 | 52 |
| *Proteus mirabilis* Firland-9 | >1000 |
| *Proteus morganii* Jenkins | >1000 |
| *Proteus rettgeri* Booth | >700 |
| *Shigella sonnei* ATCC 9290 | 52 |
| *Salmonella typhosa* ATCC 9992 | 26 |
| *Mycobacterium avium* F (Shiga University) KB44 | 200 |
| *Mycobacterium phlei* IFO 3158 | 13 |
| *Candida albicans* ATCC 10231 | >1000 |
| *Aspergilus niger* | >1000 |

As shown above, the present antibiotic is effective upon such Gram-positive bacteria as *Bacillus subtilis*, *Bacillus cereus* and the like, such Gram-negative bacteria as *Klebsiella pneumoniae*, *Escherichia coli*, *Salmonella typhosa*, etc., or acid-fast bacteria such as *Mycobacterium pheli*, etc. However, it is ineffective upon molds, yeasts, etc.

Moreover, in a bioassay in vitro, it is also effective upon *Mycoplasma gallisepticum* which is resistant to spiramycin.

As to the toxicity to animals, it has been found that, in an acute toxicity test using mice, no mice are killed even with a dose of 740 mg/kg by intravenous injection (observation for 14 days).

The present antibiotic was also tested in vivo. Specifically, mice were infected with *E. coli*. A group of ten mice were administered subcutaneously at 1 and 6 hours with a total of 1,200 mg./kg. of the antibiotic of the instant invention. All 10 untreated mice died after 24 hours. Eight of the 10 mice treated with the antibiotic here survived after the 24 hour period.

As compared with the well-known antibiotics, the present substance XK–33–F₂, is similar to antibiotics of the group of viomycin, tuberactinomycin and tuberactinomycin N in the patterns of ultraviolet absorption spectrum, elementary analysis, solubility, infra-red absorption spectrum and antimicrobial spectra. A more detailed comparison is given in the following TABLE 6.

TABLE 6

| Rf value of thin layer chromatography on silica gel | XK-33-F₂ | Viomycin[1] | Tuberactino-[2] mycin | Tuberactino-[3] mycin N |
|---|---|---|---|---|
| Developer (1) | 0.50 | 0.12 | 0.12 | 0.12 |
| Developer (2) | 0.67 | 0.67 | 0.67 | 0.67 |
| Developer (3) | 0.71 | 0.36 | 0.58 | 0.58 |
| Ultraviolet absorption |  |  |  |  |
| Max($E_{1cm}^{1\%}$) | 268ᵐ (348) (in H₂O, N/10 HCl) | 268(339) (in N/10 HCl) | 268(310) (in H₂O) | 268(342) (in H₂O, N/10 HCl) |
| " | 283ᵐ (237) (in N/10 NaOH) | 280–281.5 (219) (in N/10 NaOH) | 268.5(250) (in HCl) 285.5(180) (in NaOH) | 288(215) (in N/10 NaOH) |
| Elementary analysis |  |  |  |  |
| C (%) | 33.28 | 41.75–42.81 | 35.64 | 37.70 |
| H | 5.51 | 6.35– 6.99 | 5.96 | 6.12 |
| N | 21.73 (hydrochloride, ash 0.14 %) | 25.78–24.96 | 17.14 (sulfate) | 22.50 (Cl:13.32) |
| $[\alpha]_D^{23}$ | −12.4° (C=1, H₂O) (hydrochloride) | −33.5° (hydrochloride) | −31.5° (hydrochloride) | −19.1° (hydrochloride) |
| Color reaction |  |  |  |  |
| Ninhydrin | (+) | (+) | (+) | (+) |
| Sahaguchi | (+) | (+) | (+) | (−) |
| NMnO₄ | (+) | (+) | (+) | (+) |
| Toxicity LD₅₀ (mice, intravenous) | >740 mg/kg | 240 mg/kg | 183 mg/kg | 385 mg/kg |
| References: |  |  |  |  |

[1]L.J. Friedman: U. S. Patent 2,827,417 (1958)
[2]A. Nagata et al: J. Antibiotics 21, 681 (1968)
[3]Takuji Ando et al: 175th meeting of antibiotic-study (September 25, 1970)

As is clear from the data of TABLE 6, the Rf values of silica gel thin layer chromatography with the developers (1) and (3) shown in TABLE 4 are obviously different from those of viomycin, tuberactinomycin and tuberactinomycin N. Further, $[\alpha]_D^{25}$ of XK–33–F$_2$ is lowest and is different from those of the other three. In addition, the elementary analysis of the antibiotic of the present invention indicates a carbon content which is lower than known antibiotics. Furthermore, the antimicrobial activity of the present substance is lower than those of said three antibiotics and is about a few fractions or about one-tenth of those of the latter. On the other hand, the toxicity of the present substance is considerably lower than those of said other three.

Practice of a specific embodiment of the present invention is illustrated by the following representative example.

EXAMPLE 1

In this example, a strain ATCC 21632 of *Streptomyces olivoreticuli* var. *cellulophilus* is initially cultured in a seed medium containing 2 % glucose, 0.1 % yeast extract, 0.5 % peptone and 0.1 % CaCO$_3$ (pH 7.2 before sterilization). One loop of the seed microorganism is inoculated into 30 ml of the said seed culture medium in a 250 ml Erlenmyer flask and culturing is carried out with shaking at 30°C for 48 hours. 30 ml of the thus obtained seed culture liquor is inoculated into 300 ml of a second seed culture medium comprising 2 % glucose, 2 % defatted soybean powder and 0.1 % CaCO$_3$ (pH 7.2 before sterilization), in a 2 l Erlenmyer flask provided with baffles.

The second seed culture medium is cultured with shaking at 30°C for 48 hours. Then, 900 ml of second seed culture liquor is inoculated into 17 l of the main fermentation medium having the same composition as the second seed medium, in a 30 l glass jar fermenter. The jar fermenter culturing is carried out at 30°C for 72 hours by the aeration-stirring method (300 rpm; aeration rate: 15 l/min).

After 72 hours of culturing the antibiotics, XK–3–3–F$_2$, XK–33–F$_1$ (a substance similar to destomycin A) and XK–33–F$_3$ (viomycin) are formed in the culture liquor.

To isolate the antibiotics, 16 l of the culture liquor is added to 1.5 kg of Radiolite 600 (produced by Showa Chemical Industry CO., Ltd.), a filter aid of Celite type, and stirred for 15 minutes and filtered. Then, 11 l of the culture liquor (filtrate) is adjusted to pH 8 and passed through a column of 500 ml of Amberlite IRC - 50(NH$_4^+$ form). After washing with about 3 l of water, elution is carried out initially with 0.5 N NH OH and about 3 l of eluate is obtained. This fraction contains the substance XK–33–F$_1$, which is an antibiotic similar to destomycin A. Then, elution is further carried out with 0.5 N HCl. In the first place, XK–33–F$_2$ appears in the elution fraction between 150 ml and 200 ml, and then XK–33–F$_3$ appears in the elution fraction between 450 ml and 850 ml. XK–33–F$_3$ is identified to be viomycin. The fraction of XK–33–F$_2$ is adjusted to pH 8 and passed through a column of 100 ml of active carbon. The active carbon is one of the types adapted for chromatography which is produced by Wako Pure Chemical Industries Ltd. The adsorbed substance is thereafter eluted with a 0.5 N HCl - 80 % methanol solution after washing with water (300 ml). The active fraction is passed through a column of 50 ml of Dowex 1 × 2 (OH$^-$ form) produced by Dow Chemical Co., for neutralization. By freeze-drying the solution, about 1 g of white XK–33–F$_2$ powder is obtained. The powder is then dissolved in warm methanol and a pure product of XK–33–F$_2$ can be obtained by adding acetone thereto. Physicochemical and biological properties of the present substance are those as already described before.

What is claimed is:

1. An antibiotic XK–33–F$_2$ produced by the fermentation of *Streptomyces olivoreticuli* var. *cellulophilus* in a nutrient medium, said antibiotic being characterized by an elementary analysis of its hydrochloride of C: 33.28%, H: 5.51%, N: 21.73% and a specific rotation $[\alpha]_D^{25}$ of −12.4° (C=1, H$_2$O), and having an infra-red absorption spectrum according to FIG. 2 of the drawings.

2. A process for producing the antibiotic designated XK–33–F$_2$ which comprises: culturing the microorganism *Streptomyces olivoreticuli* var. *cellulophilus* at a temperature ranging from about 20° to about 40° C. for 2 – 7 days in a substantially neutral nutrient medium containing a carbon and nitrogen source; accumulating said antibiotic; and separating and recovering said antibiotic.

* * * * *